United States Patent
Jennings, III

(10) Patent No.: US 7,836,016 B2
(45) Date of Patent: Nov. 16, 2010

(54) METHOD AND APPARATUS FOR DISSEMINATING NEW CONTENT NOTIFICATIONS IN PEER-TO-PEER NETWORKS

(75) Inventor: Raymond B. Jennings, III, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 11/332,014

(22) Filed: Jan. 13, 2006

(65) Prior Publication Data

US 2007/0179948 A1  Aug. 2, 2007

(51) Int. Cl.
*G06F 17/30* (2006.01)
(52) U.S. Cl. ...................... 707/620; 707/770
(58) Field of Classification Search ................ 707/10; 709/201
See application file for complete search history.

(56) References Cited

U.S. PATENT DOCUMENTS

| | | | |
|---|---|---|---|
| 6,055,240 A * | 4/2000 | Tunnicliffe | 370/428 |
| 6,192,404 B1 * | 2/2001 | Hurst et al. | 709/224 |
| 7,428,237 B1 * | 9/2008 | Gai et al. | 370/395.53 |
| 2002/0046232 A1 * | 4/2002 | Adams et al. | 709/200 |
| 2002/0116639 A1 * | 8/2002 | Chefalas et al. | 713/201 |
| 2003/0088571 A1 * | 5/2003 | Ekkel | 707/100 |
| 2003/0140092 A1 * | 7/2003 | Caruso et al. | 709/203 |
| 2003/0204613 A1 * | 10/2003 | Hudson et al. | 709/231 |
| 2004/0039781 A1 * | 2/2004 | LaVallee et al. | 709/205 |
| 2004/0088348 A1 * | 5/2004 | Yeager et al. | 709/202 |
| 2004/0139173 A1 * | 7/2004 | Karaoguz et al. | 709/219 |
| 2004/0162871 A1 * | 8/2004 | Pabla et al. | 709/201 |
| 2004/0254977 A1 * | 12/2004 | Zhang | 709/201 |
| 2005/0044483 A1 * | 2/2005 | Maze et al. | 715/501.1 |
| 2005/0163133 A1 * | 7/2005 | Hopkins | 370/400 |
| 2006/0036488 A1 * | 2/2006 | Golan et al. | 705/14 |
| 2006/0047786 A1 * | 3/2006 | Doi | 709/220 |
| 2007/0022174 A1 * | 1/2007 | Issa | 709/217 |

OTHER PUBLICATIONS

Meyer, D. "Administratively Scoped IP Multicast" Jul. 1998, Network Working Group.*
Cardellini et al. "Dynamic Load Balancing on Web-Server Systems", Jun. 1999, IEEE Internet Computing.*

* cited by examiner

*Primary Examiner*—Neveen Abel Jalil
*Assistant Examiner*—Son T Hoang

(57) ABSTRACT

One embodiment of the present method and apparatus for advertising new content available for sharing in a network by a first node includes detecting the new content at the first node and sending a new content message to at least one neighbor node of the first node, where the new content message advertises the availability of the new content at the first node. In one embodiment, the new content message is sent only to neighbor nodes that have expressed an interest in receiving new content.

18 Claims, 4 Drawing Sheets

METHOD AND APPARATUS FOR DISSEMINATING NEW CONTENT NOTIFICATIONS IN PEER-TO-PEER NETWORKS

FIELD OF THE INVENTION

The present invention relates generally to computing networks and relates more particularly to advertising new content to users of peer-to-peer data transfer networks.

BACKGROUND

FIG. 1 is a schematic diagram of a network 100 of nodes (e.g., computing devices) interacting in a peer-to-peer (P2P) manner. Generally, a requesting node 101 sends a search message 105 (e.g., containing keywords relating to data that the requesting node 101 wishes to locate) to at least one intermediate node 111 in communication with the requesting node 101 via a peer connection. The intermediate node 111 receives the search message 105 and forwards the search message 105 to at least one additional node 111. Eventually, the search message 105 reaches at least one responding node 103 having the requested data (in some cases, the first intermediate node 111 to which the search message 105 is forwarded will also be a responding node 103). At least one responding node 103 then sends a response message 107 back to the requesting node 101, e.g., via the intermediate nodes 111. The requesting node 101 then requests the relevant data from a responding node 103 by connecting directly to the responding node 103, e.g., via direct connection 109.

Searches such as that described, while helpful in locating content of which a user is specifically aware, are less effective in locating completely new content in the network 100 (e.g., new music by a new artist that the user may not know, but that is similar to other artists the user likes). In such instances, new content is typically located and distributed by word of mouth or through external data sources (e.g., Internet sites). Thus, the user may not be aware of the availability of the new content.

Thus, there is a need in the art for a method and apparatus for disseminating new content notifications in P2P networks.

SUMMARY OF THE INVENTION

One embodiment of the present method and apparatus for advertising new content available for sharing in a network by a first node includes detecting the new content at the first node and sending a new content message to at least one neighbor node of the first node, where the new content message advertises the availability of the new content at the first node. In one embodiment, the new content message is sent only to neighbor nodes that have expressed an interest in receiving new content notifications.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for disseminating new content notifications in P2P networks. Embodiments of the present invention enable users of a network to advertise new content that is available for sharing to interested other users. In this way, users are informed of the availability of new content of which they might not have been aware otherwise. Moreover, users publishing their own work (e.g., music files, text files, etc.) can advertise their work to potentially interested other users rather than simply wait for other users to find the work.

Figure 1:
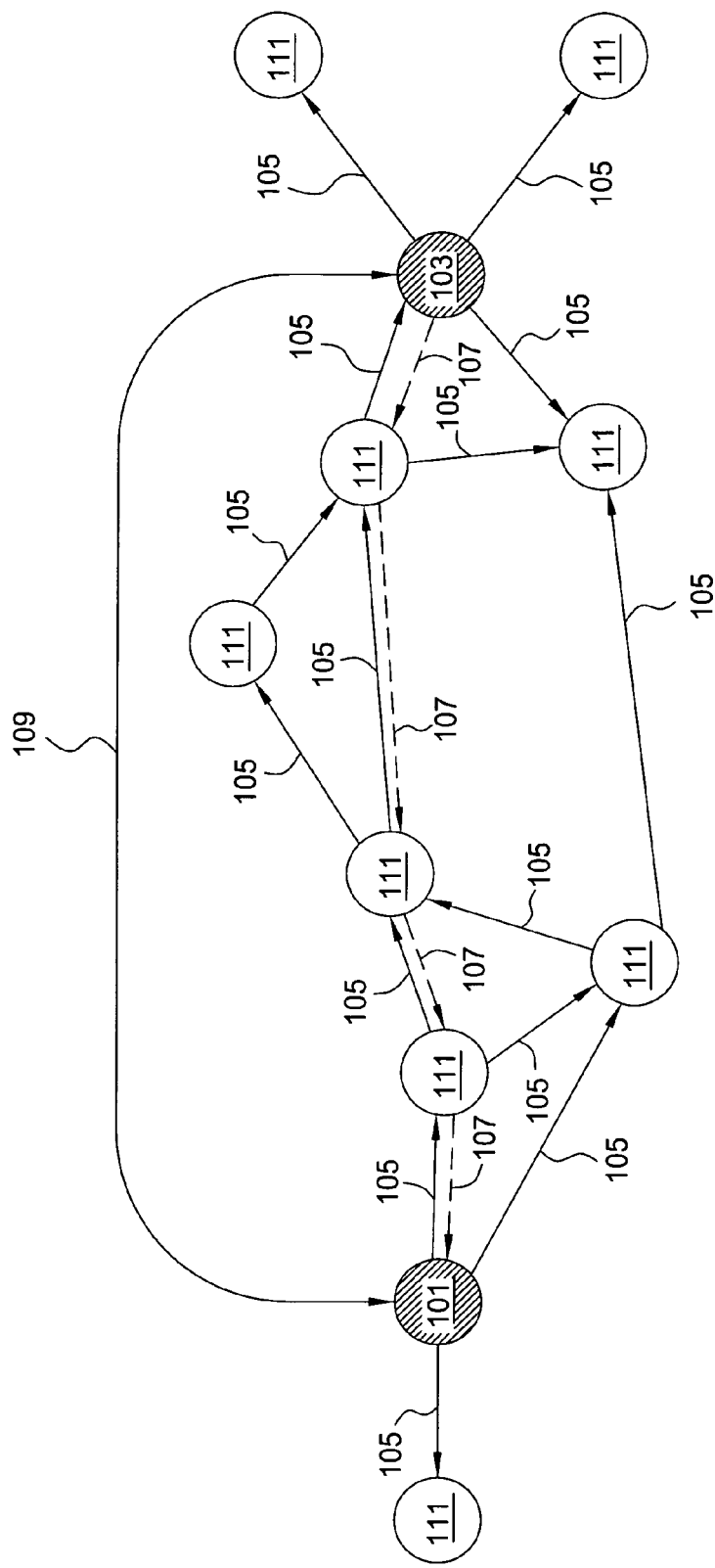
FIG. 1 is a schematic diagram of a network of nodes interacting in a peer-to-peer manner.
Figure 2:
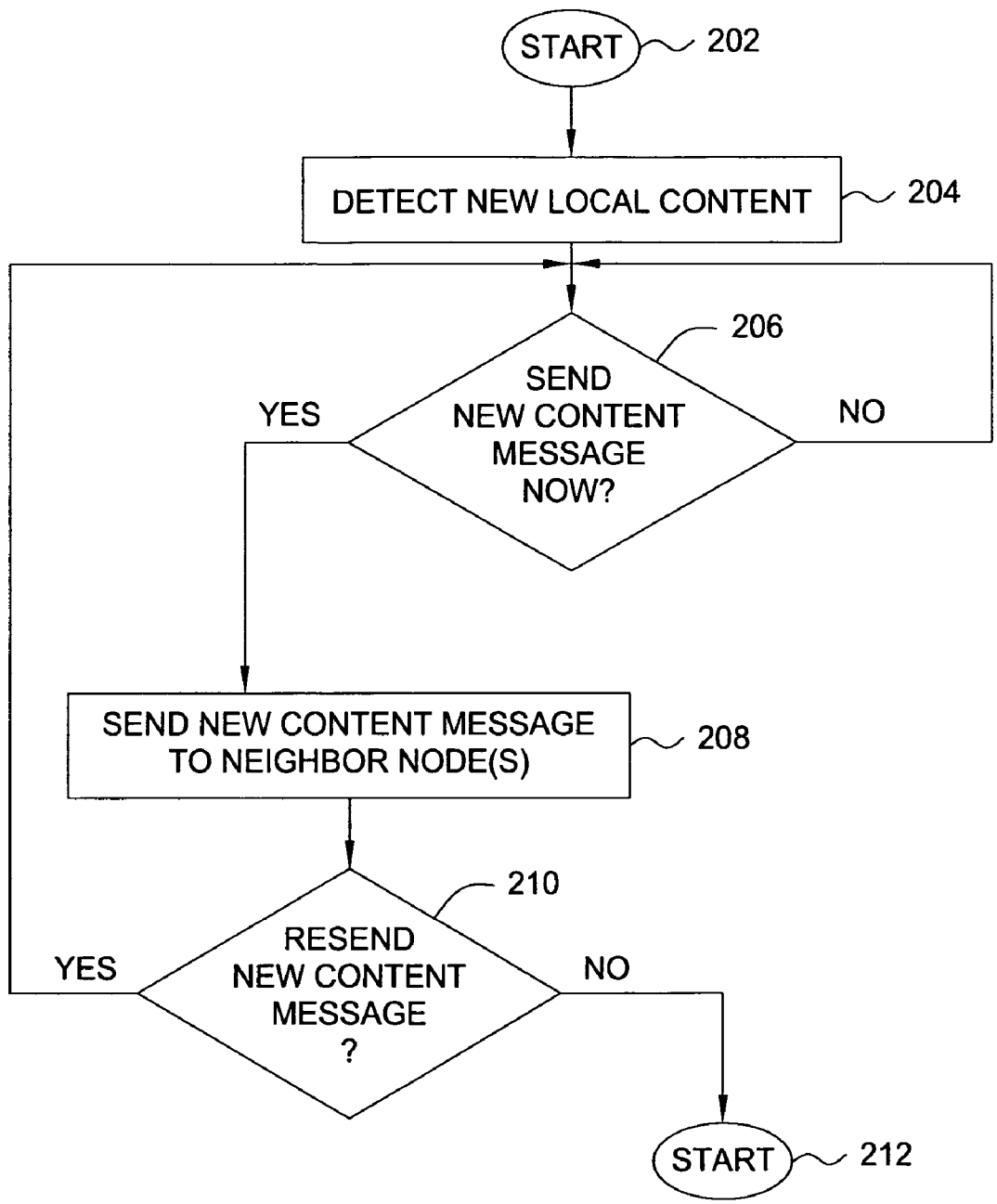
FIG. 2 is a flow diagram illustrating one embodiment of a method for disseminating new content notifications, according to the present invention.

FIG. 2 is a flow diagram illustrating one embodiment of a method 200 for disseminating new content notifications, according to the present invention. The method 200 may be executed, for example, at a first node in a P2P or other type of data transfer network.

The method 200 is initialized at step 204 and proceeds to step 206, where the method 200 detects new local content. That is, the method 200 detects new content available for sharing at the first node. In one embodiment, the new content is detected by performing automatic or periodic scans of the first node's local content database or media library, examining system data (e.g., file creation time, file modification time, meta-data such as mp3 tags, embedded data such as references) and/or querying external data sources (e.g., the Compact Disc Database or other online databases). In another embodiment, the new content is detected automatically upon a new file being deposited in the first node's shared directory.

In step 206, the method 200 determines whether a new content message alerting other nodes to the new content should be sent now. In one embodiment, a determination as to when to send a new content message is based on network conditions (e.g., currently available bandwidth, latency, etc.). In another embodiment, a determination as to when to send a new content message is based on the age of the new content (e.g., difference in time between the current time and the time at which the new content was created). In a further embodiment, a determination as to when to send a new content message is based on the number of times that the new content has been requested from the first node.

If the method 200 determines in step 206 that the new content message should not be sent now, the method 200 loops back to step 206, perhaps after first waiting a period of time, and then queries again as to whether the new content message should be sent now.

If the method 200 determines in step 206 that the new content message should be sent now, the method 200 proceeds to step 208 and sends the new content message to at least one neighbor node. In one embodiment, the new content message is sent only to neighbor nodes that have previously expressed an interest in receiving new content notifications, or in receiving new content notifications of the type detected in step 204 (e.g., based on file type, keywords, etc.).

In step 210, the method 200 determines whether to resend the new content message. In one embodiment, the new content message is periodically resent (e.g., to alert new neighbor nodes or remind existing neighbor nodes). In one embodiment, the frequency with which the new content message is resent is based on the age of the new content (e.g., difference in time between the current time and the time at which the new content was created), where the frequency with which the new content message is resent is inversely proportional to the age (i.e., the newer the new content is, the more frequently the new content message is resent). In another embodiment, the frequency with which the new content message is resent is based on the number of times that the new content has been requested from the first node, where the frequency with which the new content message is resent is inversely proportional to the number of times that the new content has been requested (i.e., the more the new content is requested, the less frequently the new content message is resent). The idea is that the older the new content becomes and the more it is requested, the more nodes there will be in the network that are either aware of the new content or have the new content and can advertise the new content for availability. Conversely, a large number of requests for the new content may indicate a heightened level of interest in the new content, thereby indicating that the new content message should be sent more often in order to be sure that new nodes receive the new content message. In further embodiments, the frequency with which the new content message is resent is based on network conditions (e.g., available bandwidth, latency, etc.). For example, it may be desirable to send the new content message only during times where there is a relatively low level of traffic.

If the method 200 determines in step 210 that the new content message should not be resent, the method 200 terminates in step 212. Alternatively, if the method 200 determines in step 210 that the new content message should be resent, the method 200 returns to step 206 and proceeds as described above in order to determine the best time to resend the new content message (e.g., in accordance with network conditions, an age of the new content, or the number of times that the new content has been requested).

In this manner, the method 200 enables network users to be alerted to the availability of new content without requiring any specific knowledge or action on the users' parts and without overburdening the network with messages. Thus, users are alerted to the availability of content in which they may be interested, but may not have been aware of the existence or availability of. Moreover, users publishing their own work (e.g., music files, text files, etc.) can advertise their work to potentially interested other users rather than simply wait for other users to find the work.

Figure 3:
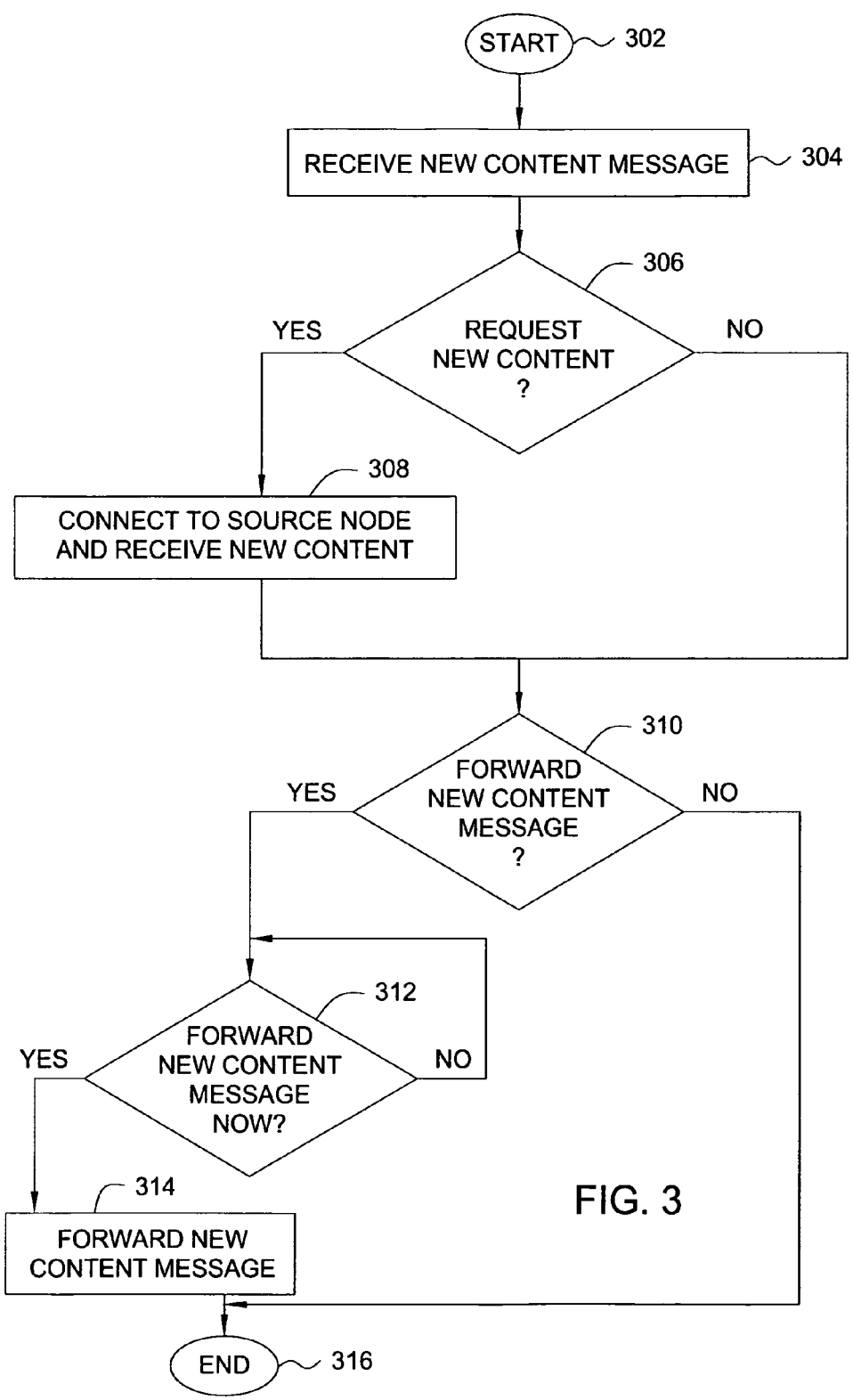
FIG. 3 illustrates one embodiment of a method for propagating new content messages, according to the present invention.

FIG. 3 illustrates one embodiment of a method 300 for propagating new content messages, according to the present invention. The method 300 may be implemented, for example, at a neighbor node of a first node that generates a new content message.

The method 300 is initialized at step 302 and proceeds to step 304, where the method 300 receives a new content message from a neighbor node. In one embodiment, the method 300 may operate in conjunction with a graphical user interface that displays new content messages in a window on a user's device display. In one embodiment, the window may allow filtering (e.g., by file type, keyword, etc.) of new content messages.

In step 306, the method 300 determines whether the new content associated with the new content message should be requested. In one embodiment, the determination as to whether to request the new content is made in accordance with preferences set by the user of the node at which the method 300 is executing. For example, the node at which the method 300 is executing could be configured to automatically retrieve new content in accordance with a user-definable profile of interests.

If the method 300 determines in step 306 that the new content should be requested, the method 300 connects to the source node (e.g., the node that originated the new content message and has the new content available for sharing) and receives the new content in step 308, for example in accordance with conventional P2P data transfer techniques.

In step 310, the method 300 determines whether to forward the new content message. If the method 300 determines in step 306 that the new content should not be requested, the method 300 skips step 308 and proceeds directly to step 310. In one embodiment, the method 300 only forwards the content if there are neighbor nodes that have expressed an interest in receiving new content. In another embodiment, the new content message is forwarded in accordance with an associated time-to-live (TTL) field that defines how many times the new content message is to be forwarded. That is, if TTL field has expired upon receipt of the new content message, the method 300 does not forward the new content message. In one embodiment, the TTL field is originally set to a value that is small relative to that of other messages sent within the network (e.g., search request messages, response messages, etc.). The TTL field value can be chosen either statically or dynamically based on network conditions (e.g., bandwidth, number of active network nodes, type of network traffic, etc.).

If the method 300 determines in step 310 that the new content message should be forwarded, the method 300 proceeds to step 312 and determines whether to forward the new content message now. In one embodiment, a determination as to when to forward a new content message is based on network conditions (e.g., currently available bandwidth, latency, etc.). If the method 300 determines in step 312 that the new content message should not be forwarded now, the method 300 loops back to step 312, perhaps after first waiting a period of time, and then queries again as to whether the new content message should be forwarded now.

Alternatively, if the method 300 determines in step 312 that the new content message should be forwarded now, the method 300 proceeds to step 314 and forwards the new content message to at least one neighbor node. In one embodiment, the new content message is forwarded only to neighbor nodes that have previously expressed an interest in receiving new content, or in receiving new content of the type advertised in the new content message. The method 300 then terminates in step 316.

In one embodiment, the number of new content messages that a user will receive from a single other user may be limited (e.g., no more than n messages per hour/day/etc.). In addition, the user has the option to disconnect from any node that abuses new content messages (e.g., by spamming). In further embodiments, a user may filter incoming new content messages for more efficient review.

Figure 4:
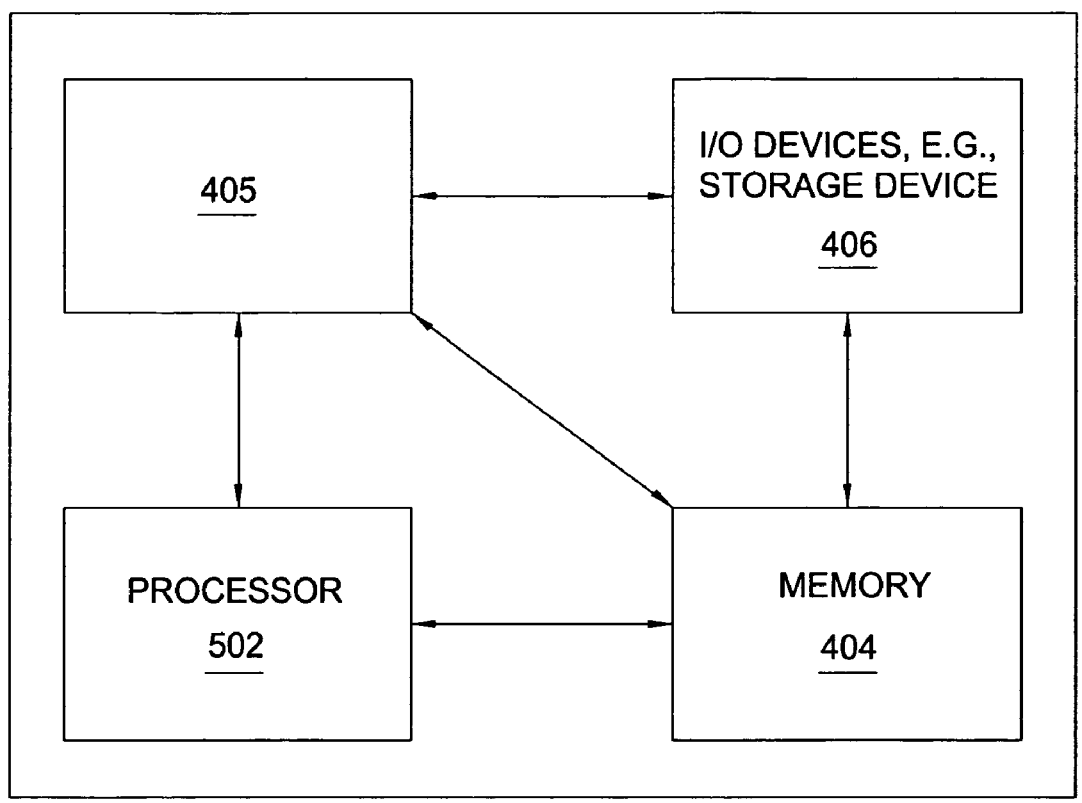
FIG. 4 is a high level block diagram of the new content dissemination method that is implemented using a general purpose computing device.

FIG. 4 is a high level block diagram of the new content dissemination method that is implemented using a general purpose computing device 400. In one embodiment, a general purpose computing device 400 comprises a processor 402, a memory 404, a new content dissemination module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the new content dissemination module 405 can be implemented as a physical device or subsystem that is coupled to a processor through a communication channel.

Alternatively, the new content dissemination module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the new content dissemination module 405 for disseminating new content notifications in a computing network described herein with reference to the preceding Figures can be stored on a computer readable medium or carrier (e.g., random access memory (RAM), magnetic or optical drive or diskette, and the like).

Thus, the present invention represents a significant advancement in the field of computing networks. A method and apparatus are provided that make it possible for users of a network to advertise new content that is available for sharing to interested other users. In this way, users are informed of the availability of new content of which they might not have been aware otherwise. Moreover, users publishing their own work (e.g., music files, text files, etc.) can advertise their work to potentially interested other users rather than simply wait for other users to find the work.

While foregoing is directed to the preferred embodiment of the present invention, other and further embodiments of the invention may be devised without departing from the basic scope thereof, and the scope thereof is determined by the claims that follow.

The invention claimed is:

1. A method for advertising new content available for sharing by a first node in a network, said method comprising:
   detecting, at said first node, new content stored locally at said first node, wherein said detecting is performed automatically by said first node;
   sending, automatically by said first node, a new content message to at least one neighbor node of said first node, said new content message advertising an availability of said new content at said first node; and
   storing, by said first node, said new content message,
   wherein a time-to-live value associated with said new content message is chosen so as to limit a number of times that said new content message is forwarded, said time-to-live value is chosen dynamically by said first node in accordance with one or more network conditions,
   wherein the time-to-live value is smaller than time-to-live values associated with other data transfer-related messages sent within the network; and
   resending said new content message at least once by said first node, wherein information contained in said new content message remains consistent each time said new content message is resent;
   wherein a frequency with which said new content message is resent by said first node is at least partially based on how many other nodes in said network have requested said new content from said first node, such that said frequency is inversely proportional to a number of times that said new content has been requested by the other nodes.

2. The method of claim 1, wherein said detecting comprises:
   examining system data associated with one or more files stored locally at said first node, wherein said system data indicates an age of said one or more files.

3. The method of claim 2, wherein said system data includes at least one of: a file creation time, a file modification time, meta-data, or embedded data.

4. The method of claim 1, wherein a frequency with which said new content message is resent by said first node is at least partially based on an age of the new content, such that said frequency is inversely proportional to said age of said new content.

5. The method of claim 1, wherein said sending further comprises:
   sending said new content message to said at least one neighbor node only when said at least one neighbor node has expressed an interest in receiving new content.

6. The method of claim 1, wherein the detecting comprises:
   performing, by said first node, periodic scans of a local content database or media library associated with said first node.

7. The method of claim 1, wherein the detecting comprises:
   observing, by said first node, that a new file has been deposited in a shared directory associated with said first node, where said new file is observed upon being deposited in said shared directory.

8. The method of claim 1, wherein the detecting is performed by said first node acting independently of a user of said first node.

9. The method of claim 1, wherein a frequency with which said new content message is resent by said first node is further at least partially based on how many other nodes in said network have requested said new content from said first node, such that a number of times that said new content message is resent is proportional to a number of times that said new content has been requested by the other nodes.

10. The method of claim 1, wherein the sending comprises:
    sending the new content message to the at least one neighbor node only when a threshold number of new content messages sent by said first node to said at least one neighbor node has not been exceeded.

11. The method of claim 1, wherein said detecting comprises:
    querying an external data source for information about the new content.

12. The method of claim 1, wherein the other data transfer-related messages include: at least one search request message containing keywords relating to data that a source of the at least one search request message wishes to locate or at least one response message indicating that a source of the at least one response message has the data.

13. A method for disseminating new content for sharing within a network, the method comprising:
    receiving and storing, at a first node, a new content message from a first neighbor node, the new content message indicating an availability of new content automatically detected by a source node that is a source of said new content message and said new content;
    determining whether to request said new content; and
    forwarding said new content message to at least a second neighbor node,
    wherein said forwarding is performed in accordance with a time-to-live value associated with said new content message, said time-to-live value is chosen dynamically by said source node in accordance with one or more network conditions,
    wherein the time-to-live value is smaller than time-to-live values associated with other data transfer-related messages sent within the network; and resending said new content message at least once by said first node, wherein information contained in said new content message remains consistent each time said new content message is resent;

wherein a frequency with which said new content message is resent by said first node is at least partially based on how many other nodes in said network have requested said new content from said first node, such that said frequency is inversely proportional to a number of times that said new content has been requested by the other nodes.

14. The method of claim 13, wherein said determining whether to request said new content comprises:

consulting, by said first node, a profile of interests associated with a user of said first node; and retrieving, by said first node, said new content when said new content matches said profile of interests.

15. The method of claim 13, wherein said retrieving is performed automatically by said first node acting independently of said user of said first node.

16. The method of claim 13, further comprising:

disconnecting from said first neighbor node in response to said receiving of said new content message.

17. The method of claim 16, wherein said disconnecting is based at least partially on an appropriateness of said new content, as determined by said first node.

18. The method of claim 13, wherein the forwarding comprises:

forwarding said new content message to said at least a second neighbor node only when said at least a second neighbor node has expressed an interest in receiving new content.

* * * * *